United States Patent
Weber et al.

[11] Patent Number: 5,616,897
[45] Date of Patent: Apr. 1, 1997

[54] FLEXIBLE KEYBOARD

[76] Inventors: Michael R. Weber, 14535 Bruce B. Down Blvd. 2221, Tampa, Fla. 33613; Paul J. Weber, 2881 E. Oakland Park Blvd., Ft. Lauderdale, Fla. 33306

[21] Appl. No.: 382,446

[22] Filed: Feb. 2, 1995

Related U.S. Application Data

[63] Continuation-in-part of Ser. No. 85,888, Jun. 30, 1993.

[51] Int. Cl.$^6$ .................................................. H01H 13/70
[52] U.S. Cl. ........................ 200/5 A; 200/512; 364/709.08
[58] Field of Search ..................................... 200/5 R, 5 A, 200/512–517; 364/708, 709.01, 709.08, 709.11; 400/472, 473, 489, 491, 491.1, 680, 681

[56] References Cited

U.S. PATENT DOCUMENTS

| | | | |
|---|---|---|---|
| 3,940,758 | 2/1976 | Margolin | 340/537 |
| 4,121,488 | 10/1978 | Akiyama | 84/1.01 |
| 4,263,659 | 4/1981 | Hirata et al. | 364/709 |
| 4,320,573 | 3/1982 | Larson | 29/622 |
| 4,845,323 | 7/1989 | Beggs | 200/85 R |
| 4,950,874 | 8/1990 | Damitio et al. | 235/145 R |
| 4,952,761 | 8/1990 | Viebrantz | 200/513 |
| 5,061,830 | 10/1991 | Ambrose | 200/5 A |
| 5,212,473 | 5/1993 | Louis | 340/711 |
| 5,220,521 | 6/1993 | Kikinis | 364/709.08 |
| 5,305,181 | 4/1994 | Schultz | 361/680 |
| 5,360,280 | 11/1994 | Camacho et al. | 400/489 |
| 5,424,728 | 6/1995 | Goldstein | 341/22 |
| 5,459,461 | 10/1995 | Crowley et al. | 341/22 |

*Primary Examiner*—Michael L. Gellner
*Assistant Examiner*—Michael A. Friedhofer
*Attorney, Agent, or Firm*—John Lezdey

[57] ABSTRACT

A flexible or roll-up electronic keyboard is provided for use with electronic devices. The keyboard is formed with a plurality of section of flexible plastic materials and embodies a dual-walled bottom which includes a network of support members which can be inflatable to provide a rigidity to the structure of the keyboard sufficient to prevent false signals. At least one separately inflatable accordion-pleated wedge means is also provided to enable variable adjustment of the plane or planes of the keyboard relative to the hands of its operator, sufficient to reduce the risk of nerve disorders such as carpal tunnel syndrome in the operator.

18 Claims, 6 Drawing Sheets

FLEXIBLE KEYBOARD

RELATED APPLICATIONS

This application is a continuation-in-part of application Ser. No. 08/085,888 filed Jun. 30, 1993.

BACKGROUND OF THE INVENTION

1. Field of the Invention

The present invention relates to keyboards or interface controls used as data input means for various electronic devices. More particularly, the present invention relates to a flexible electronic keyboard for portable electronic apparatus including industrial equipment, consumer products or appliances such as computers, telephones, musical instruments, toys, etc.

2. Description of the Prior Art

The miniaturization of electronic equipment has been a major focus in the research and development of these devices. In the case of portable electronic devices including personal computers, calculators, telephones and the like, miniaturization has been limited by the keyboard component. The keyboard component must have sufficiently large keys or keypads which are ergonomically feasible to the general population. Rigid keyboards, now in use, have fixed distance between the keys and/or between the switches to which the keys are physically connected. For this reason a full-sized keyboard presents a difficult design challenge to the miniaturization process. Use of the typical, full size keyboard would be self-defeating when applied to "notebook" or "laptop" computers, i.e.

Thus, because of their compact size, "notebook" and "laptop" computers have included keyboards of less than full size, i.e., the size of an average desktop general computer keyboard. Typically a laptop keyboard has a width of about 35 cm as opposed to an equally functional desktop computer keyboard having a width of 50 cm. Further, because the alphanumeric keys must be of a sufficient size to accommodate even large fingers, certain keys are often deleted or rearranged from their normal position on the keyboard as a sizing constraint. Such modifications can thus result in excessive motion and typing errors and can sacrifice available options associated with the missing conventional keys.

In the prior art the problem was addressed by reducing the size of the individual keys or by providing a modularly expandable keyboard. Although individual keys used in the typical keyboard could be reduced in size, such size reduction creates user difficulties in comfort and efficiency in operation.

U.S. Pat. No. 4,739,451 discloses a modularly expandable keyboard which has expansion modules capable of being integrated into a conventional keyboard.

U.S. Pat. No. 5,187,644 which is herein incorporated by reference describes a device comprising a monitor and an keyboard having one extendable flap for extending the keyboard to closely approximate a full size keyboard.

U.S. Pat. No. 4,950,874, which is herein incorporated by reference, discloses molded dome sheets which are used in electronic keyboards.

U.S. Pat. No. 4,952,761, which is herein incorporated by reference, discloses a touch contact switch which can be used in the present invention.

U.S. Pat. No. 5,141,343, which is herein incorporated by reference, discloses a keyboard assembly which can be compacted, protracted and adjusted to vary its size and the spacing between the keys thereof.

A disadvantage of known space adjusting keyboards especially for portable devices is that they either pose operating inconvenience or are prone to generating false signals, if the component parts are not properly aligned prior to use. Accordingly, there exists a need for a portable, fully functional electronic device having a light weight and a compact, substantially rigid construction, sufficient for substantially preventing false signals, but having a completely functional and full-sized keyboard, amenable to efficient use, but which can be readily compacted after use, for easy storage and/or transport.

Moreover, another problem has been noted in regard to conventional keyboards. Due to the orientation of the plane of a conventional keyboard relative to the orientation of the hands of its operator, the operator must hold his or her arms and hands in an unnatural and awkward position. Physicians have noted that prolonged periods of such activity can result in nerve disorders such as carpal tunnel syndrome.

SUMMARY OF THE INVENTION

The present invention provides a flexible or roll-up full-sized electronic keyboard assembly for electronic devices which comprises:

- a first section comprising a thin planar sheet of flexible and resilient non-conductive plastic or polymeric material having an indicia array;

- a second section comprising a thin planar sheet of flexible and resilient non-conductive plastic or polymer having a first printed circuit pattern thereon forming a set of upper switch contacts at each of a plurality of key receiving regions;

- a third section comprising a thin planar sheet of flexible and resilient non-conductive plastic or polymer having a plurality of apertures to the indicia array of the first section;

- a fourth section comprising a thin planar sheet of flexible and resilient non-conductive plastic or polymer having a second printed circuit pattern with a plurality of lower switch contacts arranged in apposition to the second section and electrically connectable thereto; and,

- a fifth section comprising two thin planar non-conductive sheets overlaid and bonded together in such a manner as to provide a network of substantially rigid gas-tight support members which function as a bottom portion. The sections are laminated in the superimposed fashion by, heat sealing or any other conventional method to provide a substantially flexible gas-tight, water proof unit.

Preferably, the keyboard assembly is provided with edge connectors terminating at two of the respective circuit patterns which are connected to a microprocessor and/or other support circuitry having suitable connection to an electronic device.

It is therefore an object of the invention to provide a keyboard for electronic devices which can be rolled-up for efficient storage and/or transport.

It is another object to provide a keyboard which can be folded as well as rolled up.

It is a further object to provide a water tight keyboard for underwater use.

It is yet another object to provide a keyboard with an expansible base to provide additional height.

It is another object of the invention to provide a deformable keyboard for electronic devices which can be worn or attached to garments.

The objects and advantages of the invention will become more clearly understood from the drawings and the following description of preferred embodiments.

Advantageously, the keyboard can also be foldable. It is further advantageous to provide the keyboard with an expansible base so as to provide a higher base and to variably orient the plane of the keyboard.

BRIEF DESCRIPTION OF THE DRAWINGS

The preferred embodiments of the invention are illustrated in the accompanying drawings:

FIGS. 6, 7, 8A, 8B and show variant species of the invention which embody a support layer or layers that provide rigidity to the keyboard when inflated with air or any other suitable fluid.

DETAILED DESCRIPTION OF THE PREFERRED EMBODIMENTS

Figure 1:
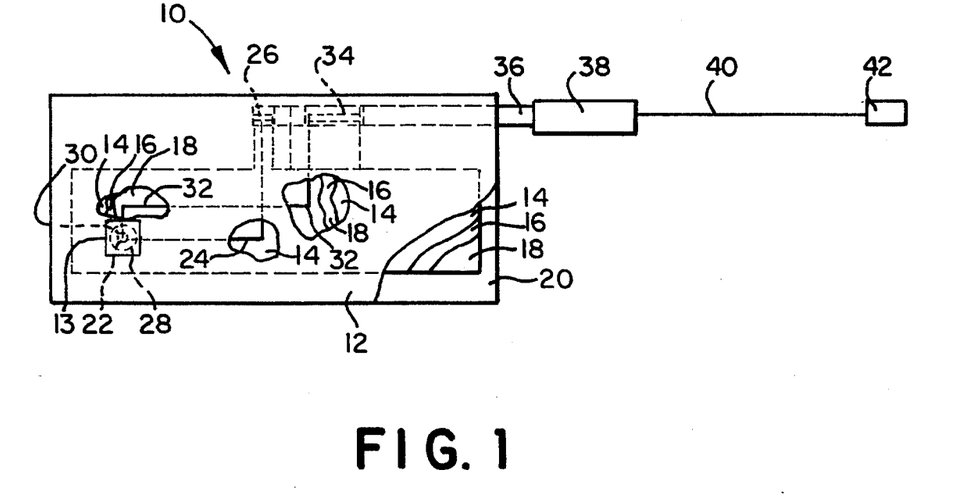
FIG. 1 is a schematic view partially in section of the keyboard assembled microprocessor with external cable connections.
Figure 2A:
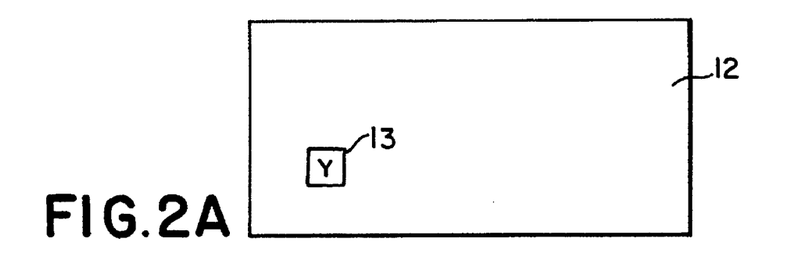
FIGS. 2A–2D are schematic views of the different plan views of the layers of the keyboard.
Figure 2B:
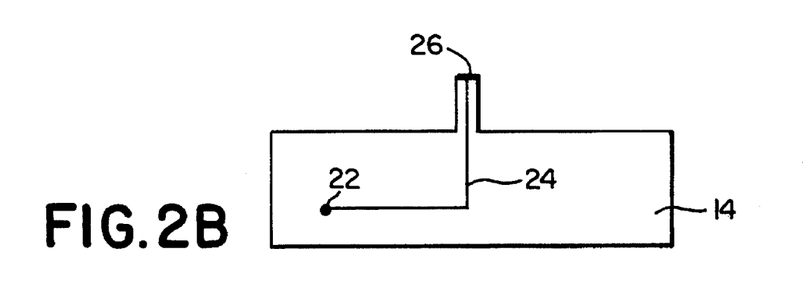
Figure 2C:
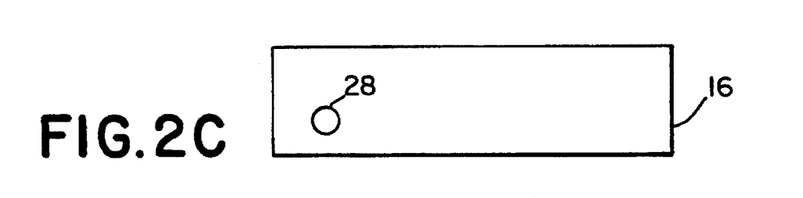
Figure 2D:
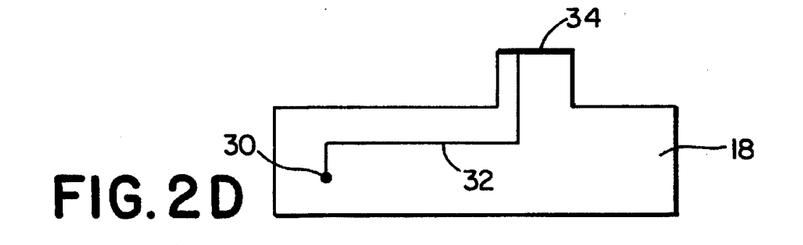
Figure 3:
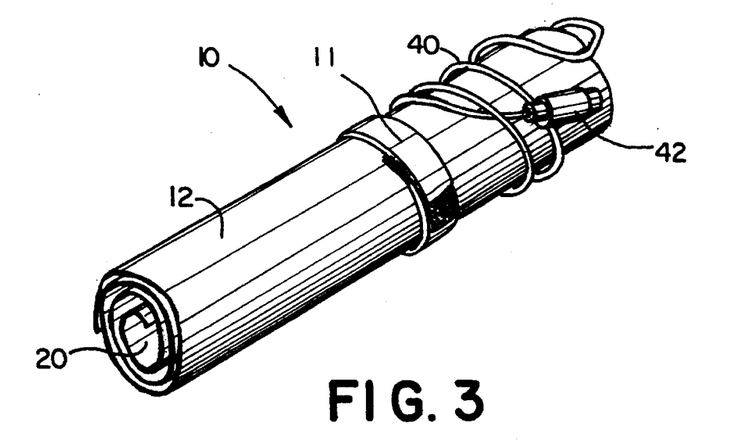
FIG. 3 a view of the keyboard microprocessor and connecting cable, after being deflated and rolled-up.
Figure 5:
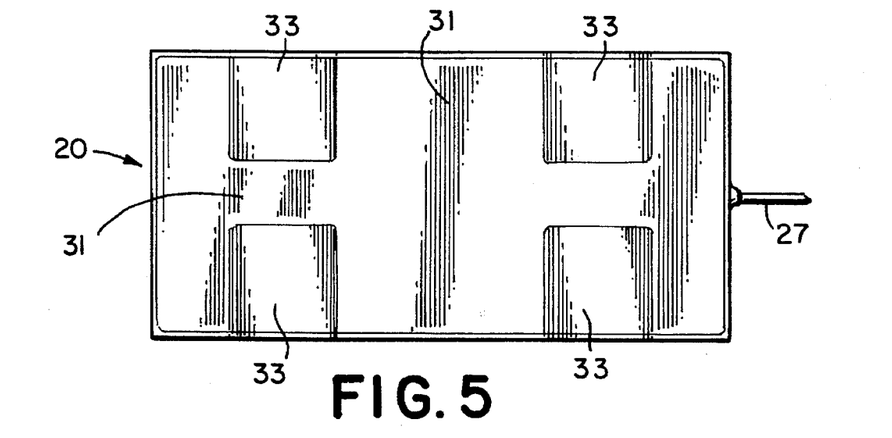
FIG. 5 is a more detailed drawing of FIG. 2E, showing a network of substantially rigid gas-tight support members.

Reference is made to FIGS. 1 to 3 for a detailed description of the invention. The several elements of the keyboard have been exploded vertically in FIGS. 2A–2D to show the details of each element and the relationship of one element to another. In FIGS. 2A–2D are shown several sections 12, 14, 16, 18 and 20 of nonconductive, flexible plastic. These sections 12, 14, 16, 18 and 20 may be sheet of thermoplastic or thermosetting flexible and resilient polymers including polyester, polypropylene, polyethylene, silicone rubber, polyurethane, etc. MYLAR® (trademark), a polyester polymer (marketed by E. I. DuPont, Wilmington, Del.) is most preferred. Additionally, the sheet may be a composite of fiberglass, steel, tin, etc. coated with plastic so that the composite is a nonconductive flexible and resilient sheet. FIG. 5 is a more detailed illustration of FIG. 2D, showing an inflated bottom section, when comprised of a network of substantially rigid gas-tight support members 1, formed by two thin planar non-conductive sheets overlaid or superimposed, and bonded together. All of the foregoing sections, including the bottom section, are laminated in the superimposed or overlaid fashion, by heat sealing or any other conventional method suitable to provide a substantially flexible, gas-tight, waterproof unit.

Section 12 is the top layer having an indicia array such as a full alphanumeric keyboard layout plus additional function keys, cursor keys and ten key numerical pad as represented by key 13 to the one side of the main keyboard layout. The details of such keyboards, key switch actuators and switching element are well know in the art of keyboard design, and hence are not required for an understanding of the present invention. For the purpose of this invention the keys are just sufficiently rigid enough so as not as send false, unintentional signals to the receiving device. Any type of malleable material may be used to form the keys. Materials of construction can range from polyvinyl chloride polymers to cloth and leather materials, suitable for producing a tactile feel with or without spring means.

The keyboard keys 13 can be molded out of a single sheet of rubber or flexible resilient plastic. This single sheet should be formed thick enough to have individual identity, but thin enough between the individual key so as not to interfere with individual key operation.

Section 14 is a thin planar substrate having a first printed circuit pattern 24 thereon forming a set of upper switch contacts 22 at each of a plurality of key receiving regions (not shown) on the substrate and an edge connector 26.

Section 16 is a thin dielectric spacer containing a plurality of apertures 28 corresponding to the indicia array of Section 12. The spacer 16 is positioned so that the first and second circuit patterns are electrically insulated from each other while at the same time allowing the indicia contactors to extend through the apertures 28 when the keys 13 are depressed.

Section 18 is a thin planar layer having a second printed circuit pattern 32 with a plurality of lower switch contacts 30 arranged in apposition to said section 14 and edge connectors 34.

Figure 2E:
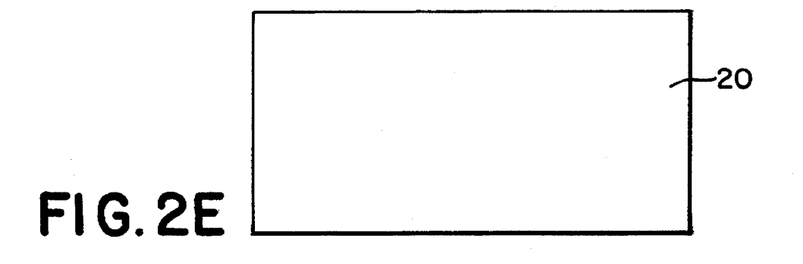

Section 2 is a thin planar bottom section which includes a network of support members that can be inflated to provide a rigidity to the structure of the keyboard sufficient to prevent false signals, and that can be thereafter deflated and rolled-up for storage and/or transport.

Optionally, a flexible metallic layer may be provided to act as a ground plane, if necessary, to suppress RF interference.

The sections 12, 14, 16, 18 and 20 may be laminated in the superposed layers as described above by adhesive, heat sealing or other conventional means to provide a flexible water proof, gas-tight unit.

FIG. 1 schematically shows a keyboard 10 assembled with external connections including a keyboard, contacts 22 and 30, edge connectors 26, 34, ribbon cable 36, housing for microprocessor and support circuitry 38, connection cable 40, and output connector 42. Although there is decoding circuitry such as the microprocessor which indicates to the computer which key has been pressed, that circuitry is know and forms no part of the present invention. Thus, it is not shown here.

In its deflated and rolled-up state, i.e. as shown in FIG. 3, the keyboard 10 has very compact dimensions and can be easily stored and/or transported. The keyboard 10 can be rolled so as to have a diameter of about 2.5 inches with a length of about 9 inches. A retractable carrying handle can be mounted on the bottom section 20 or VELCRO® (trademark) strips 11 may be applied thereto to facilitate handling. Optionally, it can be supplied as a kit including a suitable canister.

In another preferred embodiment the keyboard of the invention can be used when set into a rigid collapsible frame.

Figure 4:
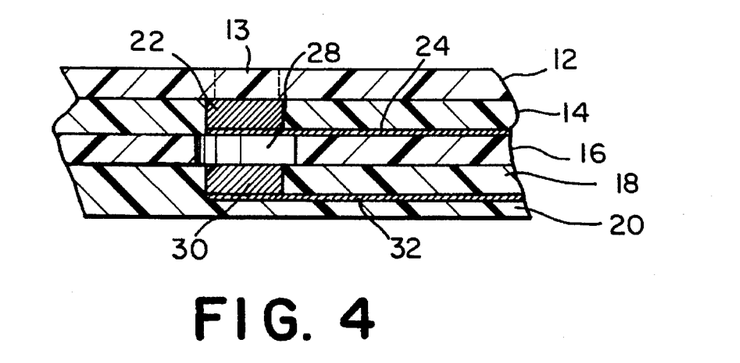
FIG. 4 is a sectional side view of the invention showing all of the different layers of the keyboard.

FIG. 4 is a sectional view of the invention which shows all of the different layers of thermoplastic or thermosetting flexible polymer 12, 14, 16, 18 and 20; first printed circuit 24; second printed circuit 32; depressed keys 13; upper electrical contacts 22; and lower electrical contacts 30, otherwise shown individually in FIGS. 2A–2E. It should again be noted that section 20, can comprise two layers of thermoplastic or thermosetting flexible polymer comprising, which when inflated, a network of substantially rigid gas-tight support members 31, as more particularly illustrated in FIG. 5.

FIG. 5 illustrates one form of an inflatable bottom layer 20 which contains inflatable sections 31, an air inlet 27 and non-inflatable sections 33.

Figure 5A:
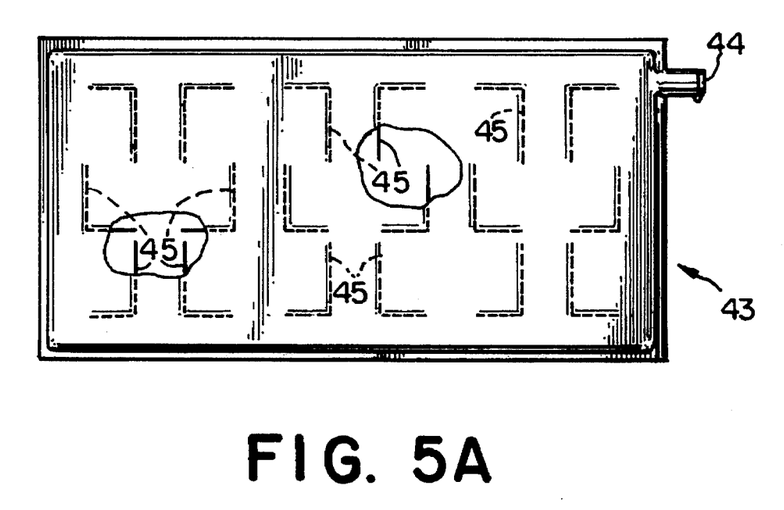
FIG. 5A is a bottom view of a keyboard with a maze of tethered septae forming the expanded bottom.

FIG. 5A shows the bottom of a flexible keyboard 43 which comprises a maze of tethered septae 45 which expands to form a rigid bottom. The sepal wall is about ½ inch in height and the bottom is expanded by use of a fluid added through inlet 44. The septae forms a more rigid bottom portion and there is a more even distribution of pressure and tension along the bottom.

Figure 5B:
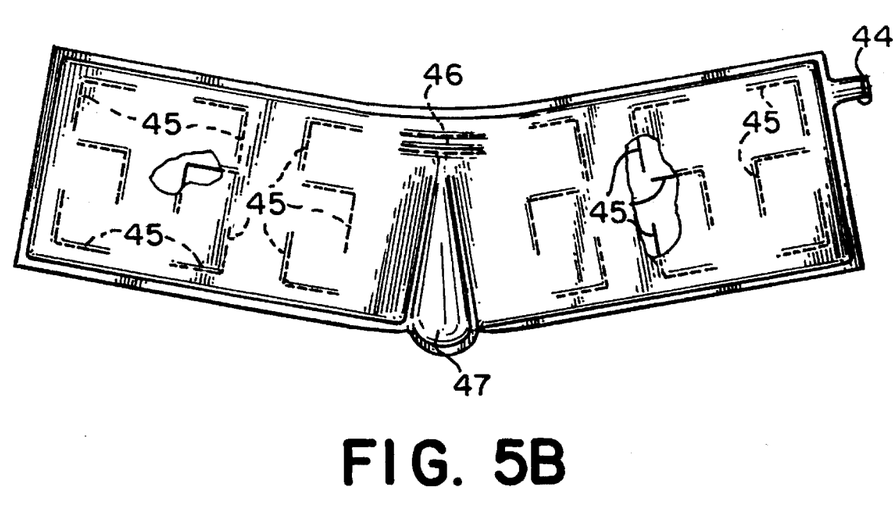
FIG. 5B is a bottom view of a keyboard with a septated bladder and a separating connection.

FIG. 5B illustrates a keyboard 43 with a flexible connecting loop 47 which allows for a partial restrictive split of the keyboard. The keyboard is partially attached with a channel 46 connecting the two portions and permitting fluid flow from a single source 44.

Figure 6:
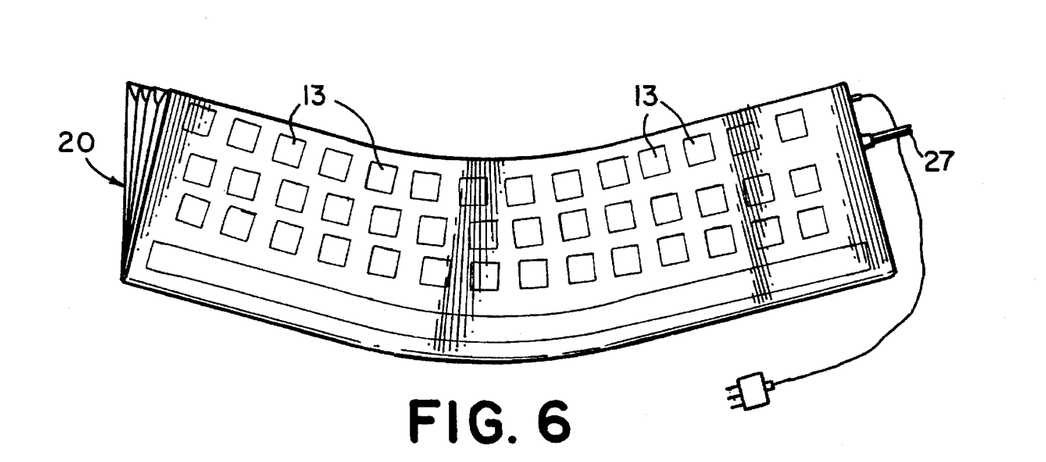
FIG. 6 is a curved, contoured, slightly deformable variant of the keyboard embodying a single inflatable/deflatable support layer.
Figure 7:
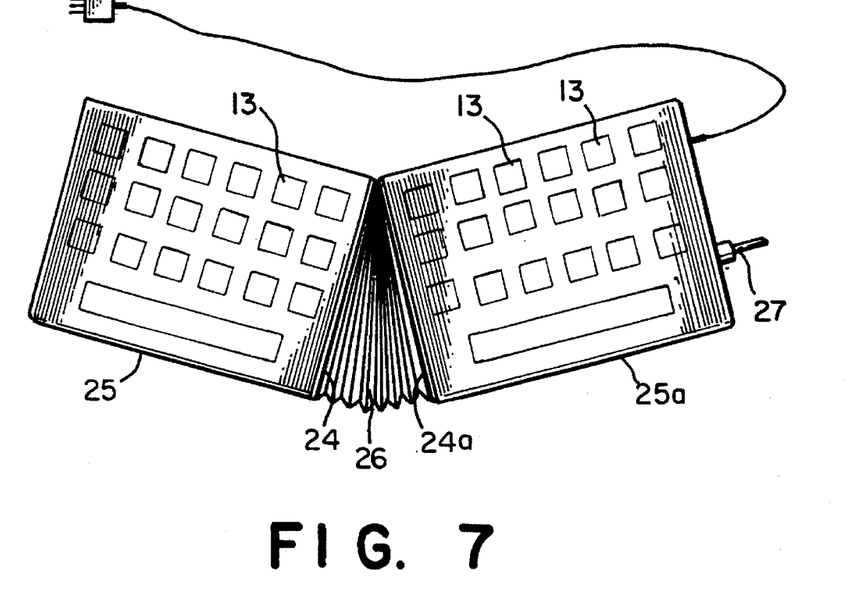
FIG. 7 is a variant embodying two inflatable/deflatable support layers included in each of two rectangular keyboard halves joined by an expandable accordion-type union at the mid-section thereof.
Figure 8A:
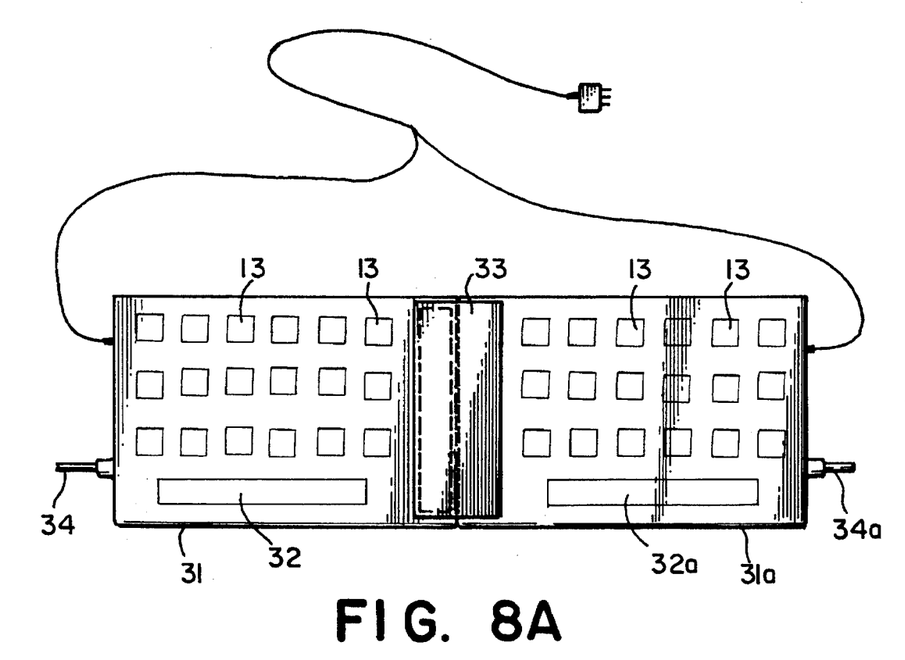
FIG. 8A is a variant embodying two inflatable/deflatable support layers included in each of two rectangular keyboard halves joined by a detachable VELCRO® (trademark) union at the mid-section thereof.
Figure 8B:
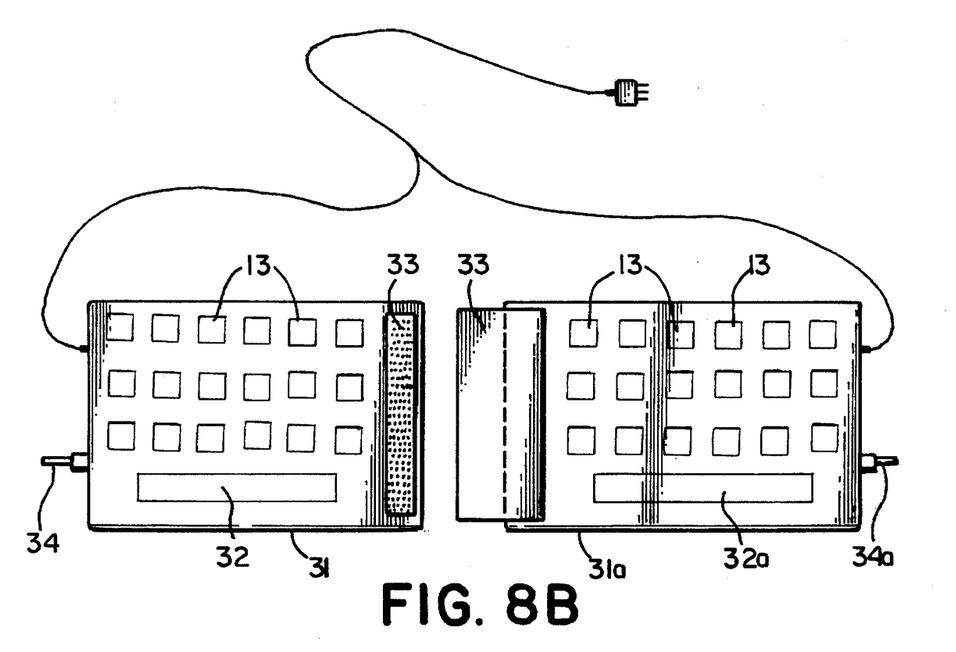
FIG. 8B shows the variant of FIG. 7A when the two keyboard halves are detached from each other.

FIG. 6 is a curved, contoured variant of the keyboard of the invention embodying a single inflatable support layer 20 and having a single inflating gas conduit 1. FIG. 7 is a variant embodying two inflatable support layers included in each of two rectangular keyboard halves 25,25a joined by an expandable accordion-pleated union 26 at the mid-section thereof and having two inflating gas conduits 1. FIG. 8A is a variant embodying two inflatable support layers included in each of two rectangular keyboard halves 32,32a joined by a VELCRO (trademark) union 33 at the mid-section thereof and having two inflating gas conduits 1. FIG. 8B shows the variant of FIG. 8A when the two keyboard halves are separated.

Figure 9:
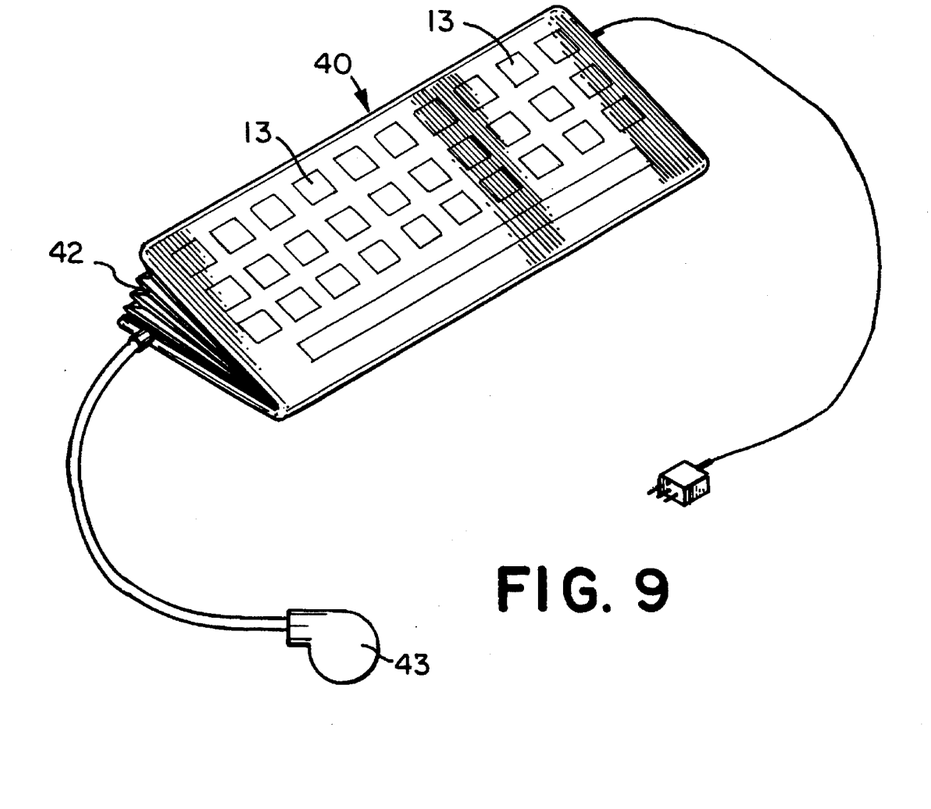
FIG. 9 shows a separately inflatable/deflatable accordion wedge means which can be fixed to the bottom of any and/or all of the inflatable/deflatable support layers of the variants of FIGS. 6, 7 and 8, for varying the respective planes of the keyboard halves relative to the hands and arms of the operator of the keyboard.

FIG. 9 shows a separately inflatable wedge means 40 having an accordance pleat 42, which can be fixed to the bottom of any of the inflatable support layers of the variants of FIG. 6, 7 and 8. Gas conduit 41 is provided for inflating the wedge means 40 sufficient for varying the respective planes of the keyboard halves relative to the hands of the operator of the keyboard, thereby minimizing the risk of nerve disorders to the operator of the keyboard, such as carpal tunnel syndrome. The wedge means 40 can be permanently bonded to the to the bottom 20, by heatsealing, adhesive or any other suitable conventional method, or removably fixed thereto with VELCRO® (trademark), or be integral with the bottom 20. The wedge means can be deflated in a similar manner as the bottom 20, when not in use.

Gas can be fed to any of the foregoing gas conduits, by any suitable gas pump means 43. A hand bulb type common to a sphygmomanometer, i.e., a blood pressure gauge, is preferred.

By means of the pleat 26 or the VELCRO union 33 the roll-up keyboard has the additional feature of being foldable or to positioned so that a portion is at an angle.

It is understood that variations may be provided which are all within the scope of the invention. For example, the keys may be made more rigid by providing resilient cup-shaped individual members for each individual key, as conventional in the prior art. Alternatively, a resilient sheet can be inserted between sections 12 and 14. The thickness of the sheet preferably is preformed sufficiently thin between the individual keys to sufficient to permit motion of any one of the keys without interfering with any other key adjacent thereto. Accordingly, the tactile touch of the keys is improved.

The printed circuitry can be screened on one of the flexible layers so as to include connections for the microprocessor 38, support circuitry, output cable, etc. Suitable material for forming the circuitry is provided by conductive materials such as gold, silver, copper and alloys thereof, or carbon. Also, foil or wires can be used in lieu of the printed circuit.

Touch contact switches, such as disclosed in U.S. Pat. No. 4,952,761 are preferably used in forming the keyboard of the invention. The keys preferably have a recognizable height of stroke, for example from about 1 to 4 mm. The height of stroke is shown in FIG. 4 as the distance between section 12 and section 20.

In lieu of contact switches, electrostatic or therm-activated switches may be utilized.

Depending upon the plastic materials used, the keyboard of the invention can be heat sealed or otherwise attached on to a variety of substrates, for example, clothing, to be used in conjunction with electronic devices carried in backpacks or which are otherwise encapsulated.

From the foregoing there has been provided a new and improved, as well as, inexpensive keyboard or interface construction for use with a wide variety of electronic devices. While only preferred embodiments are shown, it is intended that his invention be interpreted as contemplating any variations which would be apparent to those of ordinary skill in the art.

What is claimed:

1. A flexible or roll-up electronic keyboard assembly for electronic devices which comprises:

a first section comprising a thin planar sheet of flexible and resilient non-conductive plastic or polymeric material having an indicia array;

a second section comprising a circuit pattern containing an upper array of deformable contacts which are arranged in a matrix pattern;

a third section comprising a non-conductive flexible and resilient plastic or polymeric spacer with openings corresponding to the array of deformable contacts in said second section;

a fourth section comprising a non-conductive flexible and resilient plastic or polymer comprising a lower array and arranged in apposition to said second section and electrically connectable thereto connected; and a fifth bottom section comprising two overlaid layers of a non-conductive flexible and resilient plastic or polymer overlaid and bonded to form a network of substantially rigid gas filled support members when inflated; and at least one gas conduit communicating with said support members.

2. The keyboard assemble of claim 1 wherein said second and fourth sections are provide with edge connectors which are connected by a circuit pattern to a microprocessor or alternately to other support circuitry having suitable connection to an electronic device.

3. The keyboard assembly of claim 1 in which each section comprises a non-conductive flexible and resilient polymer selected from the group of polyvinyl chloride, polysiloxane, polyurethane and polyester.

4. The keyboard assembly of claim 1 wherein said first section has a plurality of flexible molded keys; and the indicia array consists of a full alphanumeric layout.

5. The keyboard assembly of claim 1 comprising tough contact switches having a stroke height of from about 1 to 4 mm.

6. The keyboard assembly of claim 1 wherein said sections are sealed so as to be waterproof.

7. The keyboard assembly of claim 1 including an elastomeric layer of key covers for providing a tactile feel to said keys.

8. The keyboard assembly of claim 1, wherein said assembly comprises the shape of a curved, substantially rigid, but slightly deformable, contoured monolith.

9. The keyboard assembly of claim 1, wherein said assembly comprises two substantially planar halves joined by a deformable accordion-pleated midsection.

10. The keyboard assembly of claim 1, wherein said assembly comprises two substantially planar halves detachably joined together at the midsection thereof.

11. The keyboard assembly of claim 1, wherein a variable inflatable/deflatable wedge means is positioned and fixed to the bottom thereof so as to variably orient the plane or planes of said keyboard relative to the hands of the operator thereof, sufficient to substantially reduce the risk of carpal tunnel syndrome to said operator.

12. The keyboard assembly of claim 11, wherein said inflatable/deflatable wedge means is permanently fixed to the bottom of said assembly.

13. The keyboard assembly of claim 12, wherein said inflatable/deflatable wedge means is detachably fixed to the bottom of said assembly.

14. In an electronic keyboard assembly for computers including a first flexible section having deformable contacts, a second flexible section having deformable contacts, and a third section which forms a spacer therebetween, the improvement which comprises a bottom section consisting of two overlaid layers of a non-conductive flexible and resilient plastic or polymer overlaid and bonded to form a network of substantially rigid gas filled support members when inflated, and at least one gas conduit communicating with said members.

15. The keyboard assembly of claim 14, wherein a variable inflatable/deflatable wedge means is positioned and fixed to the bottom thereof so as to variably orient the plane or planes of said keyboard relative to the hands of the operator thereof, sufficient to substantially reduce the risk of carpal tunnel syndrome to said operator.

16. The keyboard assembly of claim 14, wherein said assembly comprises two substantially planar halves joined by a deformable accordion-pleated midsection.

17. The keyboard assembly of claim 14, wherein said assembly comprises two substantially planar halves detachably joined together at the midsection thereof.

18. The combination of a flexible or roll-up electronic keyboard assembly for electronic devices which comprises:

a first section comprising a thin planar sheet of flexible and resilient non-conductive plastic or polymeric material having an indicia array;

a second section comprising a circuit pattern containing an upper array of deformable contacts which are arranged in a matrix pattern;

a third section comprising a non-conductive flexible and resilient plastic or polymeric spacer with openings corresponding to the array of deformable contacts in said second section;

a fourth section comprising a non-conductive flexible and resilient plastic or polymer comprising a lower array and arranged in apposition to said second section and electrically connectable thereto connected;

a fifth bottom section comprising two overlaid layers of a non-conductive flexible and resilient plastic or polymer overlaid and bonded to form a network of substantially rigid gas filled support members when inflated;

at least one gas conduit communicating with said support members; and one of the group consisting of a musical instrument, a toy, a computer and a telephone.

\* \* \* \* \*